UNITED STATES PATENT OFFICE.

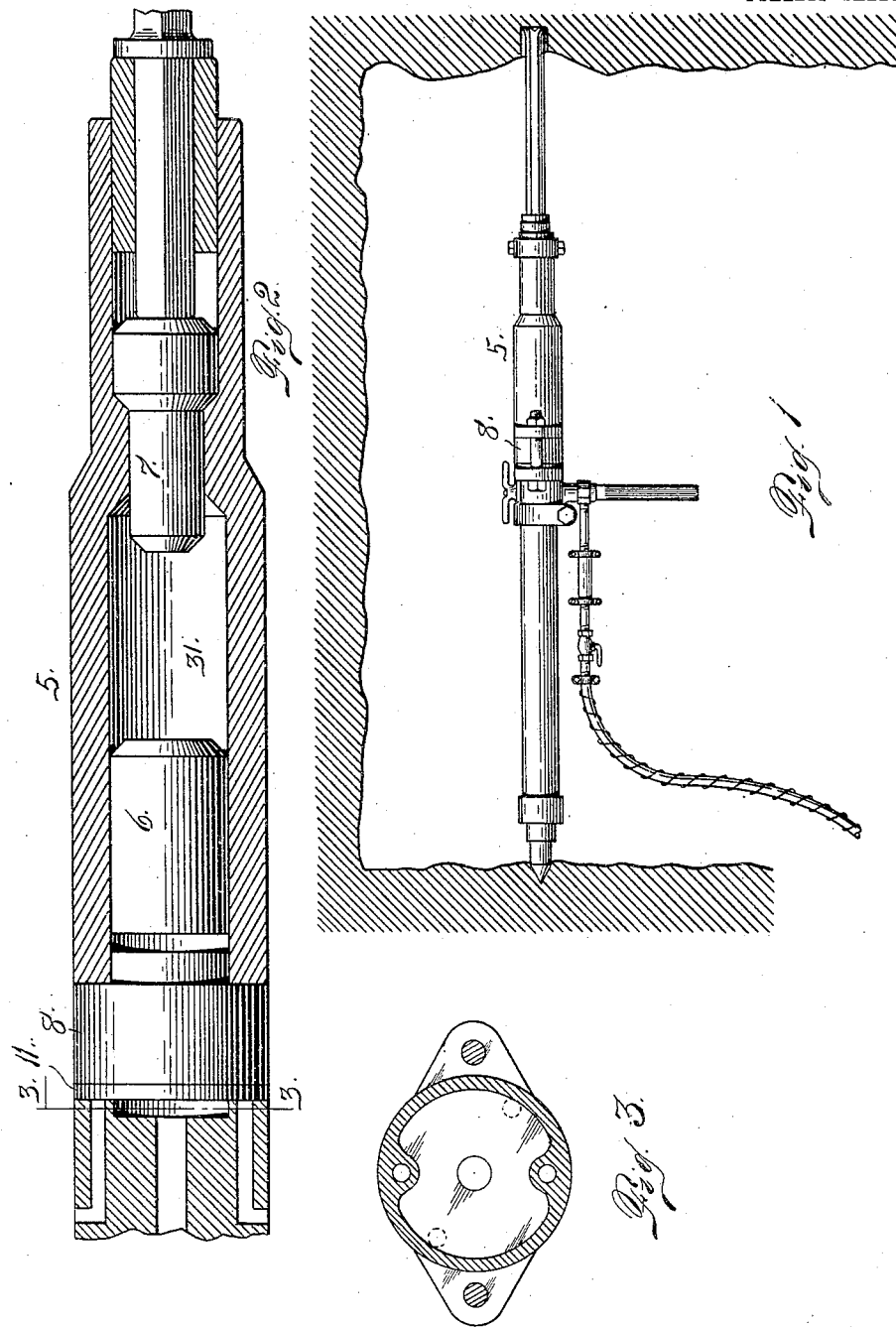

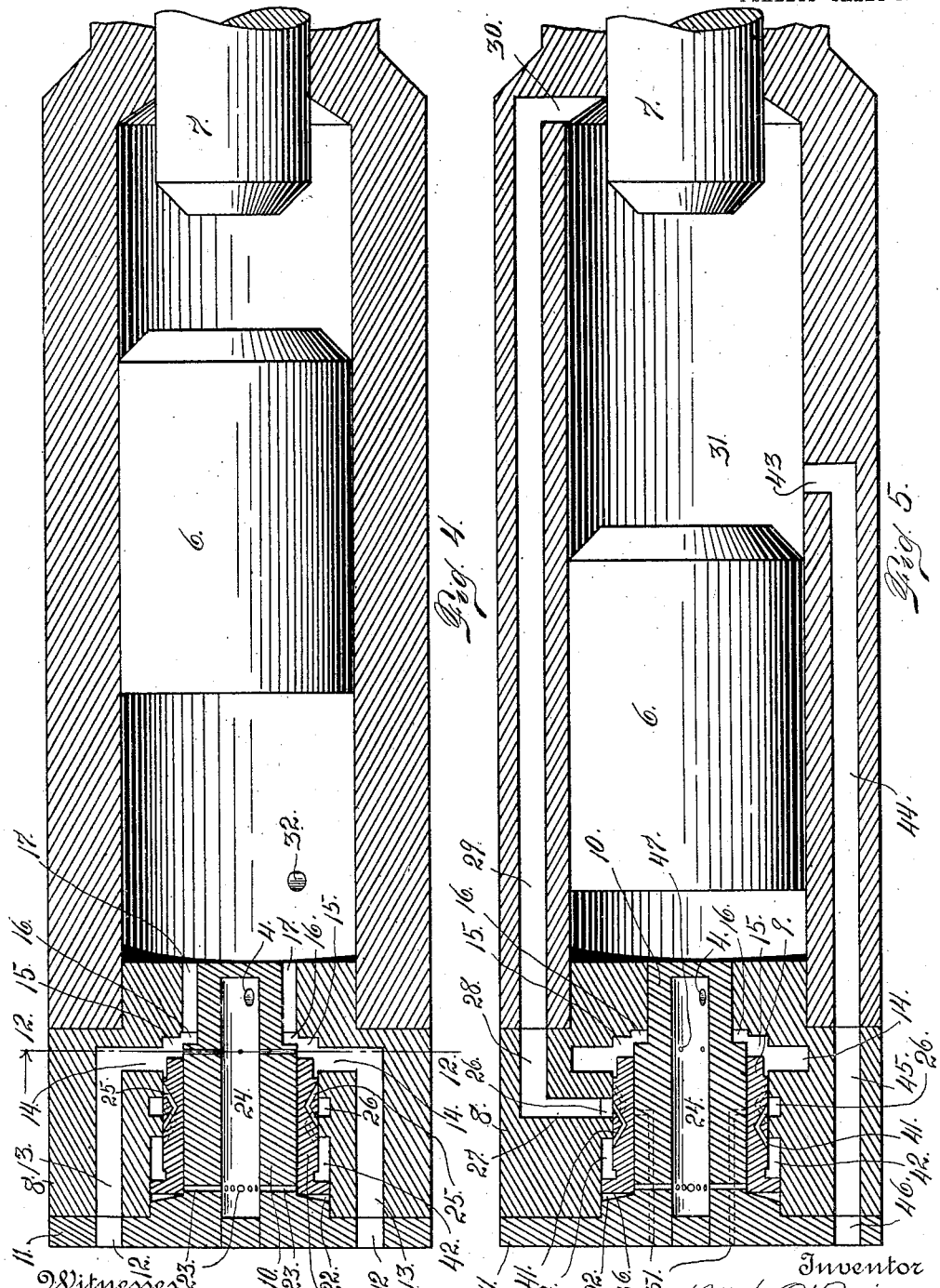

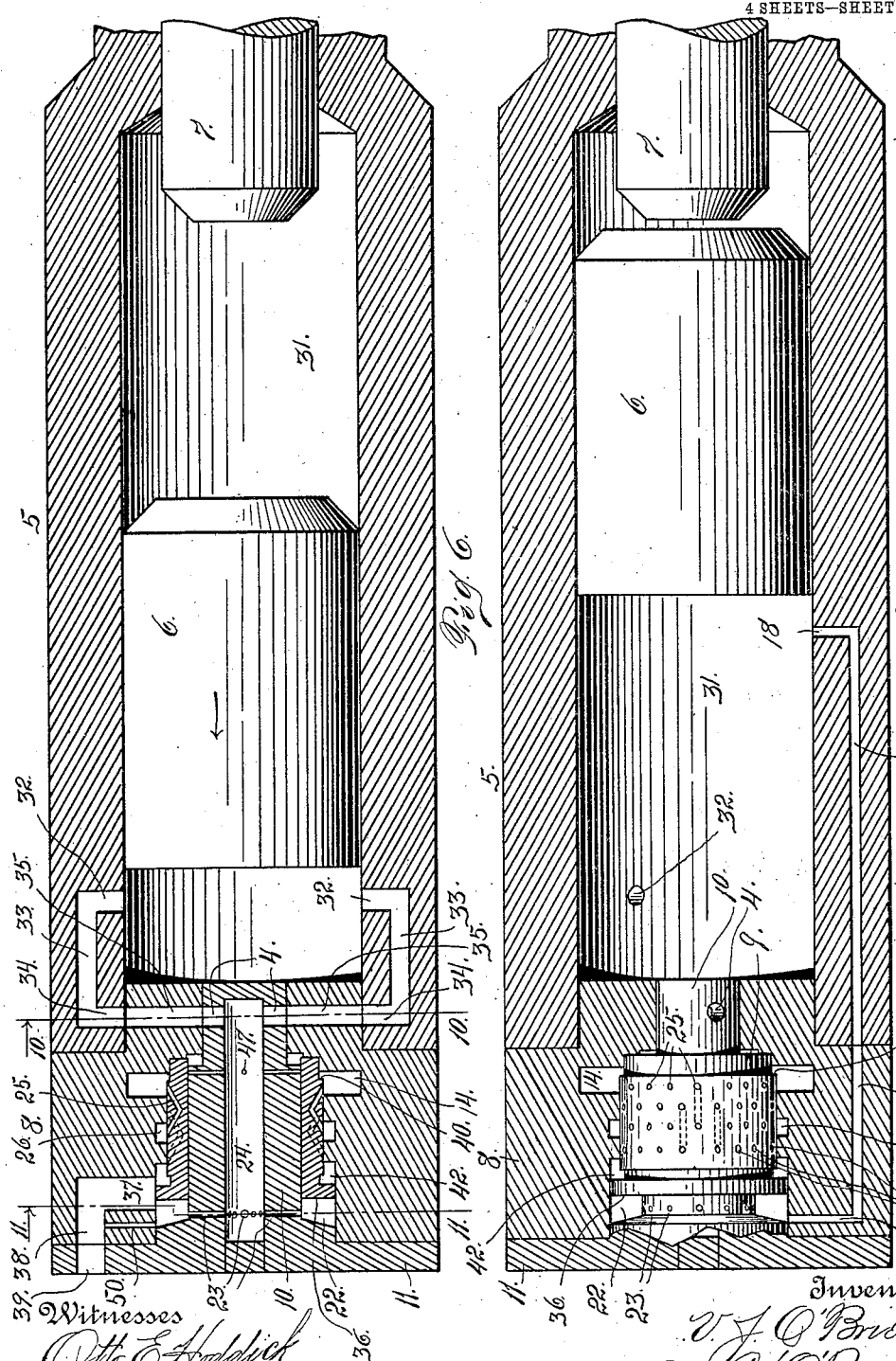

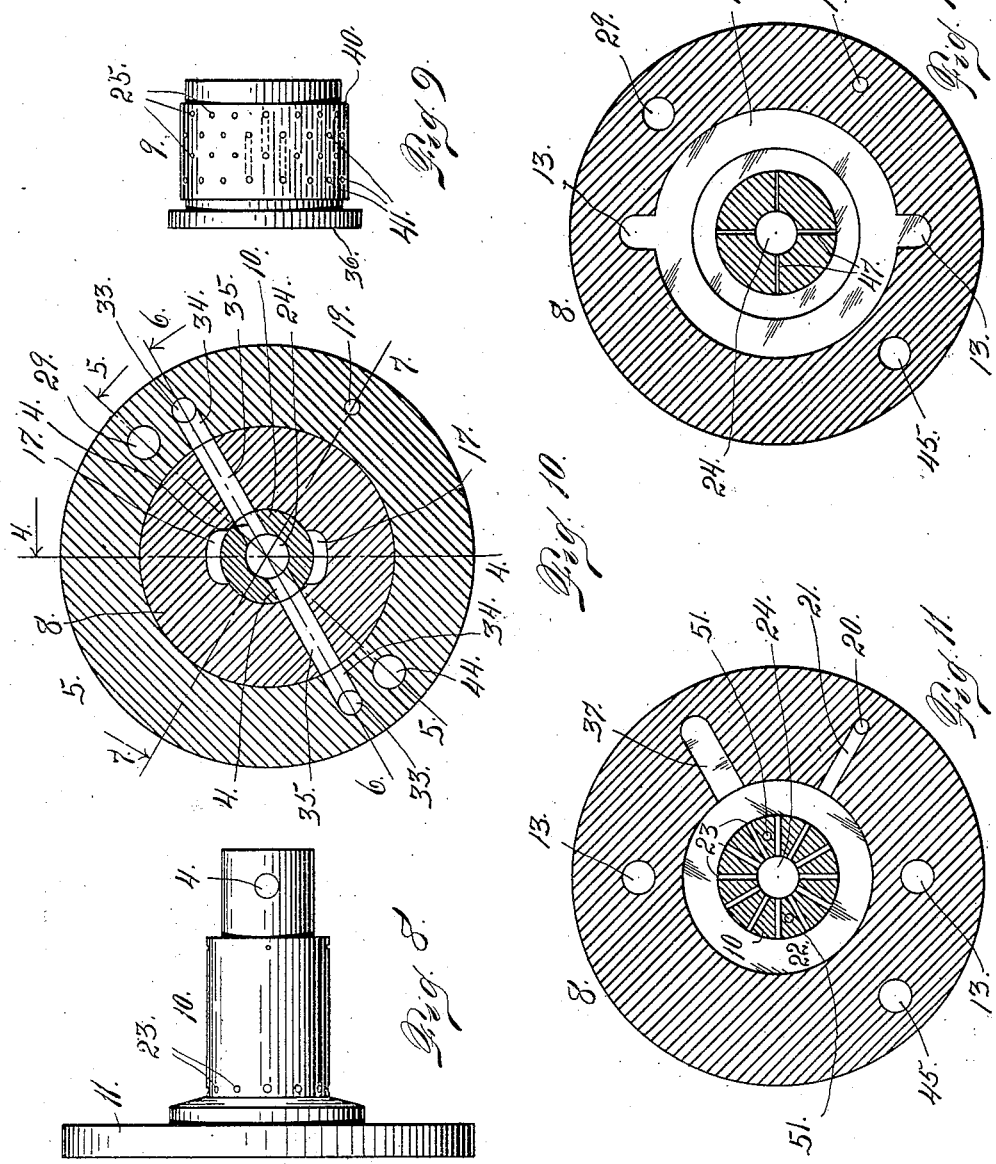

VINCENT J. O'BRIEN, OF DENVER, COLORADO, ASSIGNOR OF ONE-THIRD TO ROMEO C. AWKERMAN AND ONE-THIRD TO THOMAS PUNSHON, JR., OF DENVER, COLORADO.

VALVE FOR HAMMER-DRILLS.

962,717.   Specification of Letters Patent.   Patented June 28, 1910.

Application filed May 14, 1909. Serial No. 496,078.

*To all whom it may concern:*

Be it known that I, VINCENT J. O'BRIEN, a citizen of the United States, residing in the city and county of Denver and State of Colorado, have invented certain new and useful Improvements in Valves for Hammer-Drills; and I do declare the following to be a full, clear, and exact description of the invention, such as will enable others skilled in the art to which it appertains to make and use the same, reference being had to the accompanying drawings, and to the numerals of reference marked thereon, which form a part of this specification.

My invention relates to improvements in valves for hammer drills, my object being to provide a valve which, while properly performing the required function, shall be exceedingly durable.

My improved valve belongs to that class having differential pressure areas at its opposite extremities, the smaller of these areas being constantly exposed to the pressure of the live motive fluid, while the opposite or larger area, is intermittently exposed to the said fluid. Valves of this character as heretofore constructed have been supported, so far as I am aware, by the surrounding walls of the valve chest alone and as these walls are grooved, the wear to which the external surface of the valve is subjected by virtue of coming in contact with the edges of these grooves, is so great that the valve is short lived and must be frequently replaced.

My object is to overcome this difficulty, and to this end I equip the valve chest with a cylindrical support which passes through the hollow cylinder valve and forms an internal support therefor. By virtue of this construction the internal cylindrical core forms the support for the valve and as this core, together with the inner surface of the cylindrical valve, is practically smooth and unbroken by grooves, the valve is to a large extent relieved from the wear incident to valves of this character under ordinary circumstances.

A further improvement consists in the fact that the restricted passages formed in the valve for the purpose of the inlet and exhaust from the forward extremity of the piston chamber, are so constructed that when covered, both extremities of the passages are closed. Furthermore each of these passages is relatively small but the number of passages is sufficient to make up for the difference in the cross sectional area of the individual passages. By virtue of this construction the wear to which the valve is subjected by the action of the motive fluid is greatly reduced as compared with constructions having one or more relatively large passages for the performance of the aforesaid function.

Another feature of my improvement consists in the fact that the valve-supporting core is formed hollow and is in communication with exhaust passages formed in the cylinder for the purpose of exhausting the motive fluid from the rear extremity of the piston chamber when the latter is making its return or rearward stroke.

Having briefly outlined my improved construction I will proceed to describe the same in detail, reference being made to the accompanying drawing in which is illustrated an embodiment thereof.

In this drawing, Figure 1 is a side elevation illustrating a drill of the character to which my improvements are applicable, the same being shown in use. Fig. 2 is a longitudinal section taken through the drill cylinder with the hammer, valve mechanism and striking piston shown in elevation, the parts being shown on a larger scale. Fig. 3 is a cross section taken on the line 3—3, Fig. 2. Figs. 4, 5, 6 and 7 are longitudinal sections taken on the lines 4—4, 5—5, 6—6 and 7—7 respectively, of Fig. 10, the hammer, however, as well as the valve, being shown in different positions. Fig. 8 is a detail view of the disk and the valve-supporting core formed integral therewith, shown on a still larger scale. Fig. 9 is a detail view of the cylinder valve shown in elevation. Figs. 10 and 11 are sections taken on the lines 10—10 and 11—11 respectively of Fig. 6. Fig. 12 is a section taken on the line 12—12 of Fig. 4.

The same reference characters indicate the same parts in all the views.

Let the numeral 5 designate the body of the drill cylinder; 6 the piston hammer; 7 the striking pin; 8 the valve chest; 9 the valve proper; 10 the valve-supporting core; and 11 the disk upon which the core is mounted and with which it is formed integral.

The disk 11 is provided with intake ports 12 registering with intake passages 13 formed in the valve chest and extending forwardly where they communicate with a circular groove 14 which is also in communication with a forwardly located similar groove 15, slightly offset from the groove 14, the forward face of the groove 15 forming a seat or stop for the valve when the latter is in its forward or closed position. The groove 15 is in communication, when the valve is open, with a third groove 16, from which lead intake passages 17 to the rear extremity of the hammer chamber.

Assuming that the valve is open or in the position shown in Figs. 4 and 5, the live motive fluid enters the rear extremity of the hammer chamber through the ports 12, the passages 13, the grooves 14, 15 and 16, and the passage 17 and acts to drive the hammer 6 forwardly against the striking pin 7, whose rear extremity protrudes into the forward extremity of the hammer chamber.

Shortly before the hammer reaches its forward limit of movement, the live air in the rear thereof exhausts through a port 18 communicating with a passage 19 formed in the casing 5 and in alinement with a passage 20 formed in the valve chest and communicating at its forward extremity with a passage 21 leading to a space 22 in the rear of the rear extremity of the valve. The area of the face 36 of the rear end of the valve is greater than the area of its opposite end,—hence the live air acting upon the greater area shifts the valve to its forward or closed position (see Figs. 6 and 7). As soon as this occurs the live air from the groove 14 passes through a series of relatively small passages 25, having one extremity in communication with the live air groove 14, while their opposite extremities are in communication with a circumferential groove 26 formed in the valve chest and surrounding the valve. This live air passes from the groove 26 (see Fig. 5) through a passage 27 in the valve chest and thence through a passage 28 in the said chest to a long passage 29 formed in the cylinder casing and communicating by a port 30 with the forward extremity of the hammer chamber 31. This live air is sufficient in quantity to cause the hammer to move rearwardly in the said chamber and the air in the rear of the hammer after the latter has passed port 18, exhausts through ports 32 formed in the wall of the cylinder and communicating with passages 33 leading to ports 34 which communicate with passages 35 formed in the forward extremity of the valve chest and communicating with the central chamber 24 of the core, through ports 4 formed in the forward extremity of the said core. From the chamber 24 this exhaust air passes through ports 23 formed in the core to the space 22 and thence through a passage 37 formed in the valve chest, to exhaust ports 38 and 39 communicating with the atmosphere.

The ports 32 are located some distance from the rear extremity of the hammer chamber and after the hammer has passed these ports the remaining air within the chamber cushions in the rear thereof and prevents the hammer from striking the extremity of the valve chest. As soon as this exhaust ceases, the live air which constantly acts on a relatively small circumferential shoulder 40 of the valve, acts to shift the latter rearwardly, thus opening the valve and allowing the live air or other motive fluid to pass to the rear extremity of the hammer chamber, after which the operation heretofore explained is repeated.

During the forward movement of the hammer the air forward of the latter exhausts through the port 30, the passages 29, 28 and 27 to the groove 26, whence it travels through small ducts 41 into a groove 42 formed in the valve chest and surrounding the valve, and thence to the atmosphere through the ports 37, 38 and 39. When this occurs the small ducts 25 are closed at both extremities and when the latter are open to admit live air to the forward extremity of the cylinder, as heretofore explained, the small ducts 41 have both extremities covered. These two series of relatively small ducts 25 and 41, one series serving to supply live motive fluid to the forward extremity of the cylinder to accomplish the return movement of the piston; and the other series serving to allow the air to exhaust from the forward extremity of the cylinder during the forward movement of the piston, are an important feature of the valve, since both extremities of these small ducts are always covered when they are inactive, thus producing a double check upon the entrance of the air to these ducts and preventing the wear of the valve due to the leakage of the air from adjacent ports or passages into the said ducts.

It has been found in actual use that where recesses or ports are of considerable size, and located adjacent grooves containing live air, that this air will gradually wear the steel of the valve sufficiently to allow the air to leak from one port or passage to another. The object of the double series of small ducts, the individual ducts of each series having both extremities closed when inactive, is to overcome the aforesaid difficulty and obviate the wear of the valve due to the aforesaid cause.

The life of valves of the character in question is a very important item from a commercial standpoint in motive fluid actuated drills and pneumatic tools of all kinds, and my object is, as aforesaid, to increase the life of this valve, and at the same time maintain its entire efficiency for the purpose intended.

By the use of the core 10 passing through the hollow cylindrical valve and forming a close fit therewith, the bearing surface of the valve is more than doubled as compared with valves of this class whose exterior surface alone is engaged when in operation. By virtue of this extensive bearing or wearing surface, the wear upon the valve is correspondingly distributed whereby it is so small upon any particular part that the life of the valve is greatly increased.

After the hammer has reached a position when making its rearward stroke whereby the exhaust ports 32 are closed against the escape of motive fluid from the rear extremity of the cylinder, the exhaust port 43 is uncovered in the rear of the hammer communicating with a passage 44 formed in the wall of the cylinder and in alinement with a passage 45 formed in the valve chest, the latter being in alinement with a port 46 formed in the disk 11 of the core 10. By reason of these ports and passages the motive fluid forward of the piston is quickly exhausted and the air remaining in the rear extremity of the cylinder, cushions under the pressure of the hammer and prevents the rear extremity of the latter from coming in direct contact with the closure at the rear end of the cylinder.

The forward part of the valve-supporting core 10 is provided with a number of small ducts 47 connecting the core chamber 24 with the groove 15 of the chest, so that when the valve is open, (see Figs. 4 and 5) the live air passes through these ducts into the chamber 24 and out through the ports 4 into the passages 34 and 33, and thence into the port 32. This occurs as soon as the valve is opened so that the chamber 24 and the exhaust ports and passages forming a communication between the forward extremity of the said chamber and the rear extremity of the cylinder, are filled with motive fluid by the time the hammer has moved forwardly sufficiently to uncover the ports 32, thus preventing the retardation of the hammer's forward movement which otherwise would occur while the said chamber, ports and passages were filling with live motive fluid.

From the foregoing description the use and operation of a hammer drill equipped with my improvements will be readily understood. Assuming that the valve is open (see Figs. 4 and 5) the live motive fluid enters the rear extremity of the cylinder through the port 12, the passage 13, grooves 14, 15 and 16, and passage 17, filling the rear end of the cylinder and acting upon the hammer 6 to drive the latter forwardly against the striking pin 7. Just before the hammer reaches its forward limit of movement, the port 18 in the rear of the hammer is uncovered and the live air passes through said port into the passages 19, 20 and 21, into the rear part of the space 22 in the rear of the valve and acting on the greater pressure area of the latter, drives the latter forward against the live air, acting upon the lesser pressure area of the valve's opposite extremity. As soon as this occurs the live air from the groove 14 passes through the series of small angular ducts 25 into the groove 26 and thence through passages 27, 28, 29 and port 30 into the forward extremity of the cylinder, acting upon the hammer to drive the latter rearwardly. As the hammer moves rearwardly it closes the port 18 but the air or motive fluid in the rear of the cylinder exhausts freely through the ports 32, passages 33 and 34, ports 4, core chamber 24, and port 36, into the space 22 in the rear of the valve, and thence through passages 37 and 38 and port 39 to the atmosphere. As the hammer continues its rearward travel, it finally closes the ports 32, after which there being no escape for the balance of the air in the rear extremity of the cylinder, this acts as a cushion upon the hammer to prevent the latter from striking the parts, closing the rear end of the cylinder chamber. As soon as the exhaust through the groove 22 in the rear of the valve is cut off by the hammer as aforesaid, the live motive fluid, acting upon the small shoulder or reduced pressure area 40, serves to shift the valve rearwardly, whereby the small angular ducts 41 have one extremity communicating with the groove 26, while their opposite extremities communicate with the groove 42 whereby the motive fluid from the forward extremity of the cylinder is exhausted through the port 30, passages 29, 28 and 27, groove 26, ducts 41, and groove 42, which is in communication with the atmosphere through passages 37 and 38 and port 39. Simultaneously with this exhaust from the forward extremity of the cylinder, the live air passes through the small ducts 47, filling the core chamber 24, the ports 4, the passages 34, 33 and the ports 32. At the same time the live air enters the rear extremity of the piston chamber through the passages 17 and imparts the forward movement to the hammer, causing it to engage the striking pin as heretofore explained. Before the hammer begins its forward movement the motive fluid in the forward portion of the cylinder is exhausted through the port 43, the passages 44 and 45 and the port 46 to the atmosphere.

The rear extremity of the valve chest is provided with a relatively small port 50, communicating at one extremity with the rear portion of the space 22 and at its opposite extremity with the exhaust port or passage 38. The object of this port 50 is to permit the escape of any live air that may leak into the rear extremity of the space 22, when the valve is open, thus preventing the possible accidental closure of the valve through such leakage.

The core 10 is provided with small oil passages 51 whose inner extremities open on the exterior surface of the core upon which the valve is mounted, whereby the bearing surfaces of the core and valve may be kept properly lubricated.

Having thus described my invention, what I claim is:

1. The combination with a hammer cylinder and a motive fluid actuated hammer therein, of a valve chest, a hollow cylindrical valve mounted to reciprocate therein, and a hollow core passing through the valve and forming a support therefor, the said core having a centrally located exhaust passage communicating with the rear extremity of the cylinder, the forward end of the core being closed.

2. The combination with a hammer cylinder and a motive fluid actuated hammer therein, of a valve chest, a hollow, cylindrical valve, mounted to reciprocate therein, its opposite extremities being provided with differential pressure areas, and a hollow core passing through the valve and coöperating with the valve chest, to form a support therefor, the core having a central exhaust passage and its forward extremity being closed and flush with the surrounding surface of the rear end of the hammer cylinder.

3. The combination with a hammer cylinder and a motive fluid actuated piston therein, of a hollow, cylindrical valve having differential pressure areas, one of which is constantly exposed to the live motive fluid, and the other intermittently exposed thereto, and a hollow core passing through the valve and coöperating with the valve chest to form a support therefor, whereby an extensive wearing surface is provided for the valve, the hollow of the core forming an exhaust passage while the forward extremity of the core is closed.

4. The combination with a hammer cylinder and a motive fluid actuated hammer therein, of a hollow, cylindrical valve for controlling the motive fluid supply to, and exhaust from the cylinder; the said valve being mounted to reciprocate and having differential pressure areas, the smaller of which is constantly exposed to the live motive fluid and the larger of which is intermittently exposed thereto, and a hollow core forming a support for the valve, and through which the exhaust from the rear extremity of the cylinder passes, the forward end of the said core being closed.

5. The combination with a cylinder and a motive-fluid-actuated piston therein, of a hollow cylindrical valve mounted to reciprocate for controlling the supply and exhaust of the motive fluid, the valve having a series of relatively small ducts which when the valve is shifted in one direction, introduces live motive fluid to the forward extremity of the cylinder, and another series of similar ducts which when the valve is shifted in the opposite direction, allows the motive fluid to exhaust from the forward extremity of the cylinder.

6. The combination with a cylinder and a motive-fluid-actuated piston therein, of a hollow cylindrical valve mounted to reciprocate and having two series of relatively small ducts, one series being in communication with the forward extremity of the cylinder and with the live motive fluid supply when the valve is shifted in one direction; and the other series of ducts being in communication with the forward extremity of the cylinder and with the atmosphere for exhaust purposes when the valve is shifted in the opposite direction.

7. The combination with a cylinder and a motive-fluid-actuated piston therein, of a valve chest and a hollow cylindrical valve mounted to reciprocate therein, the said valve having two series of relatively small passages, the one series being arranged to be in communication with the live motive fluid and the forward extremity of the cylinder when the valve is shifted in one direction; and the other series being in communication with the exhaust and with the forward extremity of the cylinder when the valve is shifted in the opposite direction, both extremities of the individual ducts of each series being covered when the ducts are inactive.

8. The combination with a cylinder and a motive-fluid-actuated piston therein, of a valve chest, a hollow cylindrical valve mounted to reciprocate therein, said valve having two series of ducts, the individual ducts of each series having both extremities exposed on the outer surface of the valve, one series of ducts being in communication with the live motive fluid and the forward extremity of the cylinder when the valve is shifted in one direction; and the other series of ducts being in communication with the exhaust and the forward extremity of the cylinder when the valve is shifted in the opposite direction, one series of ducts being always closed when the other series is in use for the passage of motive fluid, each series of ducts having both extremities of each duct covered when the ducts are closed.

9. The combination with a cylinder, a motive fluid actuated piston therein, and a tool in alinement with the piston, of a hollow, cylindrical valve, mounted to reciprocate for automatically regulating the supply and exhaust of the motive fluid, and a hollow interior support for the valve through which the exhaust from the rear extremity of the cylinder passes, the forward extremity of the said support being closed.

10. The combination of a hammer cylinder and a motive fluid hammer therein, of a hollow, cylindrical valve located in the rear of the cylinder for controlling the supply and exhaust of the motive fluid, the cylinder having an exhaust port a short distance forward of its rear extremity, the latter being otherwise closed against the escape of motive fluid, a hollow, cylindrical valve mounted to reciprocate for regulating the supply and exhaust of the motive fluid, a hollow core communicating with the said cylinder exhaust port, the forward extremity of the core being closed and flush with the surrounding rear end wall of the hammer chamber.

11. The combination with a cylinder, a motive fluid actuated piston therein and a tool in alinement with the piston, of a hollow, cylindrical valve for controlling the supply and exhaust of motive fluid, the said valve being mounted to reciprocate, and a hollow supporting core passing through the valve, the chamber of the core being closed at its forward end and in communication with the rear extremity of the cylinder for exhaust purposes by means of an angular passage.

12. The combination with a cylinder, a motive fluid actuated piston therein, and a tool in alinement with the piston, of a hollow cylindrical valve mounted to reciprocate for regulating the supply and exhaust of motive fluid, and a hollow supporting core passing through the valve, the chamber of the core being closed at its forward extremity and in communication with the rear extremity of the cylinder by an angular passage, and with the atmosphere for exhaust purposes, when the valve is in the closed position.

13. The combination of a cylinder, a motive-fluid-actuated piston therein, a hollow cylindrical valve mounted to reciprocate, a hollow core passing through the valve and forming a support therefor, the cylinder having exhaust ports located a short distance forward of its rear extremity, said ports being in communication by suitable passages, with the chamber of the core, and small ports formed in the core, and in communication with the live motive fluid when the valve is open, for filling the core chamber and the passages between said chamber and the ports in the rear portion of the cylinder for the purpose set forth.

14. A hollow cylindrical valve having differential pressure areas at its opposite extremities and two series of relatively small ducts located intermediate its extremities, the individual ducts of both series having both extremities exposed on the exterior surfaces of the valve, and closed when not in use.

15. A hollow cylindrical valve having differential pressure areas at its opposite extremities, and two series of relatively small longitudinally disposed ducts located intermediate its extremities, each duct of each series having both extremities ope on the exterior surface of the valve and closed when not in use, substantially as described.

16. A hollow cylindrical valve having differential pressure areas at its opposite extremities and two series of relatively small ducts located intermediate its extremities and arranged in staggered relation, the individual ducts of both series having both extremities exposed on the exterior surfaces of the valve, and closed when not in use.

In testimony whereof I affix my signature in presence of two witnesses.

VINCENT J. O'BRIEN.

Witnesses:
Tom Punshon, Jr.,
Jessie F. Hobart.